United States Patent
Donnelly et al.

(10) Patent No.: US 10,043,316 B2
(45) Date of Patent: Aug. 7, 2018

(54) VIRTUAL REALITY EXPERIENCE FOR A VEHICLE

(71) Applicant: Uber Technologies, Inc., San Francisco, CA (US)

(72) Inventors: Richard Donnelly, Pittsburgh, PA (US); David McAllister Bradley, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 15/229,923

(22) Filed: Aug. 5, 2016

(65) Prior Publication Data

US 2018/0040162 A1     Feb. 8, 2018

(51) Int. Cl.
*G06T 19/00*      (2011.01)
*G02B 27/01*      (2006.01)
(Continued)

(52) U.S. Cl.
CPC ........ *G06T 19/006* (2013.01); *G02B 27/0093* (2013.01); *G02B 27/0179* (2013.01);
(Continued)

(58) Field of Classification Search
CPC ............... G06T 19/006; G06T 2215/16; G06T 2207/30236; G02B 27/0093; G02B 27/0179; G02B 2027/0187; G05D 1/0246; G05D 1/0278; G05D 2201/0212; G08G 1/167; G08G 1/0104; G08G 1/0962; G08G 1/017; G08G 1/096791; G08G 1/0112;
(Continued)

(56) References Cited

U.S. PATENT DOCUMENTS 6,424,410 B1    7/2002  Pelosi
8,996,224 B1    3/2015  Herback
(Continued)

FOREIGN PATENT DOCUMENTS

WO    WO 2015/099679    7/2015

OTHER PUBLICATIONS

Gervautz et al., Anywhere Interfaces Using Handheld Augmented Reality, 2012, IEEE, p. 26-31.*

(Continued)

*Primary Examiner* — McDieunel Marc
(74) *Attorney, Agent, or Firm* — Mahamedi IP Law LLP

(57) ABSTRACT

A virtual reality system provides autonomous vehicle (AV) sensor data to applications such as games and augmented reality overlays to enhance experiences for riders in the autonomous vehicle. Virtual reality headsets offer users unique and interesting experiences, but when used in a changing environment such as a moving vehicle, external stimuli can impair the virtual reality experience. AV sensors can predict these stimuli so that applications can take measures to reduce their impacts on virtual reality experiences. In addition, sensors can include cameras that send live video feeds to virtual reality devices to render improved views of the environment around the AV and of landmarks in a city. Furthermore, virtual reality devices can take advantage of the AV's computing resources in order to offer better performance and more features to applications.

20 Claims, 8 Drawing Sheets

(51) Int. Cl.
*G02B 27/00* (2006.01)
*G05D 1/02* (2006.01)

(52) U.S. Cl.
CPC ......... *G05D 1/0246* (2013.01); *G05D 1/0278* (2013.01); *G02B 2027/0187* (2013.01); *G05D 2201/0212* (2013.01)

(58) Field of Classification Search
CPC ............ G08G 1/0116; G06K 9/00671; G06K 9/00798; G06K 9/00805; G06K 9/00832; G06K 9/00791; G06K 9/00335; G06K 9/00818; G06K 9/00825
USPC .......................................................... 701/28
See application file for complete search history.

(56) References Cited

U.S. PATENT DOCUMENTS

| | | | |
|---|---|---|---|
| 9,171,268 B1 | 10/2015 | Penilla | |
| 9,335,764 B2* | 5/2016 | Herz | G05D 1/0038 |
| 9,411,780 B1 | 8/2016 | Awad | |
| 9,440,605 B2 | 9/2016 | Vadgama | |
| 2005/0040573 A1 | 2/2005 | Bolt | |
| 2013/0197674 A1 | 8/2013 | Lowry | |
| 2015/0084985 A1 | 3/2015 | Baudu | |
| 2015/0097864 A1 | 4/2015 | Alaniz | |
| 2015/0109131 A1 | 4/2015 | Lindberg | |
| 2015/0185034 A1 | 7/2015 | Abhyanker | |
| 2015/0338852 A1 | 11/2015 | Ramanujam | |
| 2015/0339928 A1 | 11/2015 | Ramanujam | |
| 2015/0346722 A1* | 12/2015 | Herz | G05D 1/0038 701/2 |
| 2016/0001720 A1 | 1/2016 | Vadgama | |
| 2016/0318442 A1 | 11/2016 | James | |
| 2016/0330578 A1 | 11/2016 | Moussavian | |
| 2016/0347348 A1 | 12/2016 | Lubischer | |
| 2016/0358453 A1 | 12/2016 | Wassef | |
| 2017/0103571 A1 | 4/2017 | Beaurepaire | |
| 2017/0113702 A1* | 4/2017 | Thieberger-Navon | B60W 50/14 |
| 2017/0126810 A1 | 5/2017 | Kentley | |
| 2017/0132334 A1 | 5/2017 | Levinson | |
| 2017/0132769 A1 | 5/2017 | Barron | |
| 2017/0151918 A1 | 6/2017 | Boesen | |
| 2017/0153636 A1 | 6/2017 | Boesen | |
| 2017/0158023 A1 | 6/2017 | Stevanovic | |
| 2017/0253252 A1* | 9/2017 | Donnelly | B60W 50/0098 |
| 2017/0256229 A1 | 9/2017 | Kocharlakota | |
| 2017/0277191 A1 | 9/2017 | Fairfield | |
| 2018/0040162 A1* | 2/2018 | Donnelly | G06T 19/006 |
| 2018/0040163 A1* | 2/2018 | Donnelly | G06T 19/006 |
| 2018/0089901 A1 | 3/2018 | Rober | |

OTHER PUBLICATIONS

Munoz et al., PhysioVR: A Novel Mobile Virtual Reality Framework for Physiological Computing, 2016, IEEE, p. 1-6.*
Brogan et al., Dynamically Simulated Characters in Virtual Environments, 1998, IEEE, p. 58-69.*
Rao et al., AR-IVI—Implementation of In-Vehicle Augmented Reality, 2014, IEEE, p. 3-8.*
Ai et al., Real-time Unmanned Aerial Vehicle 3D Environment Exploration in a Mixed Reality Environment, 2016, IEEE, p. 664-670.*
Ahi-Hua et al., Design of UAV Telepresence and Simulation Platform based on VR, 2008, IEEE, p. 520-524.*
Santano et al., Aerial Videography in Built Heritage Documentation: The Case of Post-Independence Architecture of Malaysia, 2014, IEEE, p. 1-6.*
Chae et al., The Comparison of the Detecting Performance between the Ground and the Aerial Visual Analytics in the UGV-UAV Collaborative System, 2016, IEEE, p. 524-529.*
ISR and Written Opinion in PCT/US2017/023411 dated Jul. 13, 2017.
Gervautz, et al. Anywhere Interfaces Using Handheld Augmented Reality, 2012, IEEE, p. 26-31.
Munoz, et al., PhysioVR: A Novel Mobile Virtual Reality Framework for Physiological Computing, 2016, IEEE, p. 1-6.
Brogan, et al., Dynamically Simulated Characters in Virtual Environments, 1998, IEEE, p. 58-69.
Rao, et al., AR-IVI—Implementation of In-Vehicle Augmented Reality, 2014, IEEE, p. 3-8.
Ai, et al. Real-Time Unmanned Aerial Vehicle 3D Environment Exploration in a Mixed Reality Environment, 2016, IEEE, p. 664-670.
Zhi-Hua, et al., Design of UAV Telepresence and Simulation Platform based on VR, 2008, IEEE, p. 520-524.
Santano, et al., Aerial Videography in Built-Heritage Documentation: The Case of Post-Independence Architeture of Malaysia, 2014, IEEE, p. 1-6.
Chae, et al., The Comparison of the Detecting Performance between the Ground and the Aerial Visual Analytics in the UGV-UAV Collaborative System, 2016, IEEE, p. 524-529.

* cited by examiner

VIRTUAL REALITY EXPERIENCE FOR A VEHICLE

BACKGROUND

Virtual reality is a computer technology that replicates an environment, real or imagined, and simulates a user's physical presence to allow for user interaction. Virtual realities artificially create sensory experiences, which can include sight, touch, hearing, and smell, and are displayed either on a computer screen or with a special virtual reality headset (also called a head-mounted display).

Augmented reality displays a view of a physical, real-world environment whose elements are supplemented by computer-generated sensory input such as sound, video, graphics, or GPS data. Thus, the technology functions by enhancing one's current perception of reality. Augmentation is conventionally done in real-time and in semantic context with environmental elements, such as sports scores on TV during a match. With the help of advanced augmented reality technology (e.g. adding computer vision and object recognition), information about the surrounding world of the user can be overlaid on the world and become interactive and digitally manipulable.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
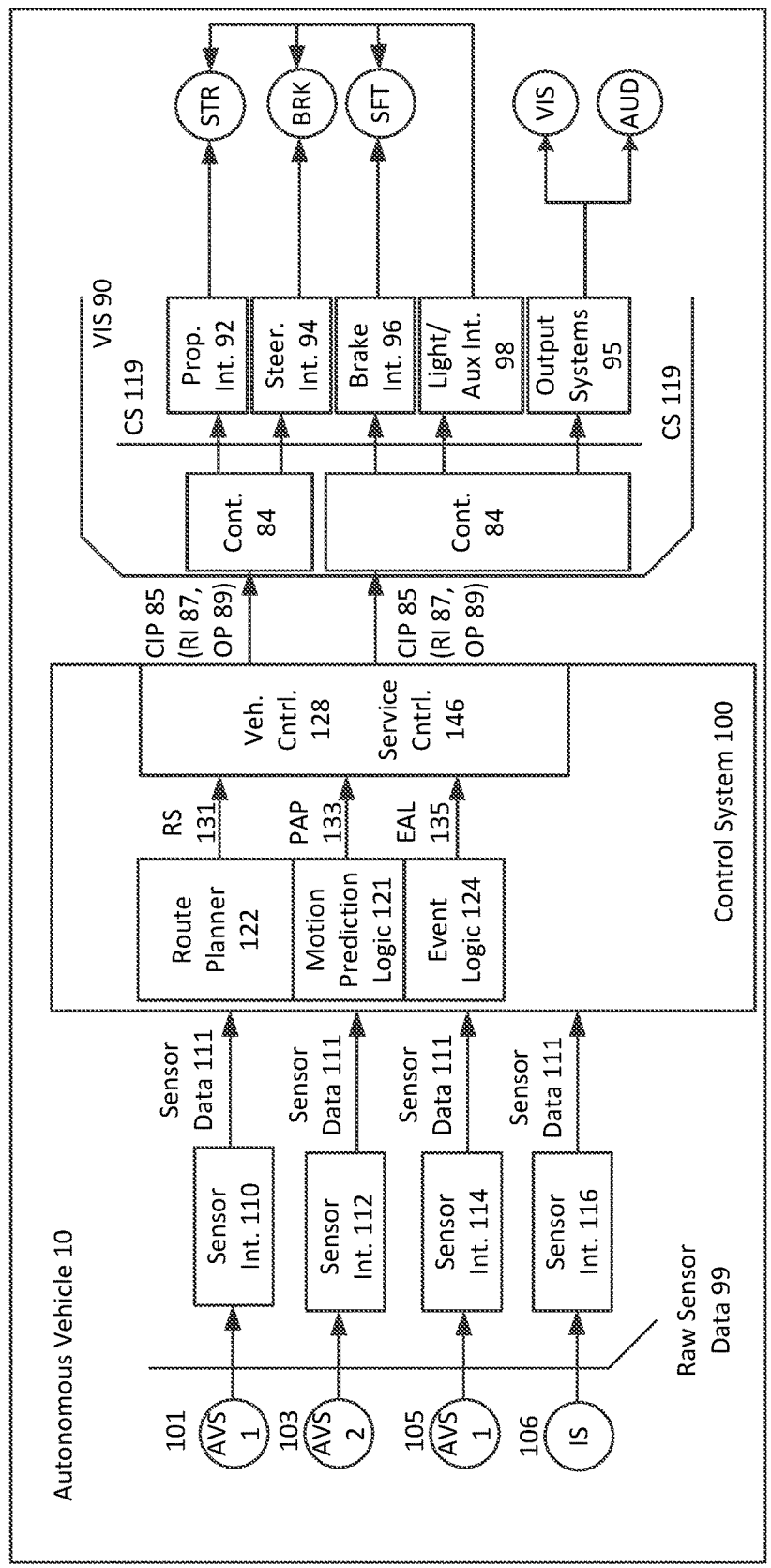
FIG. 1 is a block diagram illustrating an example control system for operating an autonomous vehicle including, as described herein.

A virtual reality system is disclosed that provides autonomous vehicle (AV) sensor data to applications such as games and augmented reality overlays to enhance experiences for riders in the autonomous vehicle. Virtual reality headsets offer users unique and interesting experiences, but when used in a changing environment such as a moving vehicle, external stimuli can impair the virtual reality experience. AV sensors can predict these stimuli so that applications can take measures to reduce their impacts on virtual reality experiences. In addition, sensors can include cameras that send live video feeds to virtual reality devices to render improved views of the environment around the AV and of landmarks in a city. Furthermore, virtual reality devices can take advantage of the AV's computing resources in order to offer better performance and more features to applications.

Most people travel the same routes at the same times of day over and over again and are interested in using their travel time for something other than looking at whatever is currently visible out of the vehicle's windows. In an AV that can navigate a route without human intervention, any rider in the vehicle can wear a head-mounted display or other device for entertainment, communication, touring, gaming, news, advertising, and enhanced views of the local area around the rider or other local areas compatible with the vehicle's physical motion. However, bumps in the road, turns, and other forces on the rider can be distracting or even cause motion sickness for a rider wearing a headset.

In some examples, a motion prediction system can use route data from the current location to the ride's destination to estimate the future motion trajectory of the riders in an AV. Route data can include information such as the expected duration of the ride, turns and other expected vehicle movement, the time between such movements, etc., any combination of which the vehicle can use to predict the forces that riders may experience at various points along the route segments to the destination. As the AV proceeds down the route, sensors can update these predictions in real-time and provide them to virtual reality applications or services that can incorporate the predicted stimuli into content appropriate for the application in order to minimize any negative aspects of the stimuli on the rider.

On top of the problems of undesirable stimuli and motion sickness, a rider wearing a virtual reality headset in an AV cannot see other passengers inside the vehicle. This rider cannot keep track of personal belongings such as a briefcase or purse and may unintentionally collide with another passenger. Among other benefits, the examples described herein include internal AV sensors to monitor the body positions of surrounding passengers to allow the rider to maintain situational awareness while being immersed in a virtual experience. For example, a rider would be able to see a representation of other passengers to avoid colliding with them or to monitor if another passenger is accessing their personal belongings.

In some examples, an AV equipped with a virtual reality system can provide riders with tourist-centric content such as live feeds of points of interest from cameras, live feeds of the AV cameras, and curated content stored in databases. With these sources of data, the virtual reality system can enhance a rider's view of a surrounding city by offering the rider tourist information as a virtual overlay on top of the real city around them. That is, the virtual reality system can record real-time video from cameras mounted on top of the AV and, combined with 3D volumetric data, render video of the environment with modified or additional content overlays. This allows a rider to see farther than would ordinarily be possible from inside a vehicle without obstructions such as the vehicle frame or other nearby vehicles blocking the view.

Among other benefits, the examples described herein can monitor available computing resources that are not being used for essential functions of the AV and make these resources available to increase the quality of virtual reality services. Rendering high-fidelity graphics at acceptable framerates is currently beyond the computing power of most mobile devices. However, AVs can provide extra memory, computing cycles, and graphics hardware to improve virtual reality experiences for riders in the AV. A virtual reality system can further trigger virtual reality services to scale content based on the extra AV computing resources available.

As used herein, a computing device refers to devices corresponding to desktop computers, cellular devices or smartphones, personal digital assistants (PDAs), laptop computers, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Numerous examples are referenced herein in context of an autonomous vehicle (AV). An AV refers to any vehicle which is operated in a state of automation with respect to steering and propulsion. Different levels of autonomy may exist with respect to AVs. For example, some vehicles may enable automation in limited scenarios, such as on highways, provided that drivers are present in the vehicle. More advanced AVs drive without any human assistance from within or external to the vehicle. Such vehicles often are required to make advance determinations regarding how the vehicle is behave given challenging surroundings of the vehicle environment.

System Description

FIG. 1 shows a block diagram illustrating an AV in accordance with example implementations. In an example of FIG. 1, a control system 100 can be used to autonomously operate an AV 10 in a given geographic region for a variety of purposes, including transport services (e.g., transport of humans, delivery services, etc.). In examples described, an autonomously driven vehicle can operate without human control. For example, in the context of automobiles, an autonomously driven vehicle can steer, accelerate, shift, brake and operate lighting components. Some variations also recognize that an autonomous-capable vehicle can be operated either autonomously or manually.

In one implementation, the control system 100 can utilize specific sensor resources in order to intelligently operate the vehicle 10 in most common driving situations. For example, the control system 100 can operate the vehicle 10 by autonomously steering, accelerating, and braking the vehicle 10 as the vehicle progresses to a destination. The control system 100 can perform vehicle control actions (e.g., braking, steering, accelerating) and route planning using sensor information, as well as other inputs (e.g., transmissions from remote or local human operators, network communication from other vehicles, etc.).

In some implementations, the control system 100 can utilize the sensor resources to predict forces and other stimuli on the vehicle's riders. The control system 100 can make these predicted forces available through a platform and application programming interface to devices and applications such as a virtual reality (VR) headset running a VR game or visual overlay. The game can then incorporate the predicted forces into content for the game so that a rider wearing the VR headset experiences events that mimic the forces or other stimuli inside the game. In addition, VR games and overlays can use sensor resources to enhance views of the local area around the AV. Aspects of the control system 100 can also manage computing resources between vehicle functionality and VR functionality, providing extra resources to gaming and overlay features when the AV does not require those resources.

In an example of FIG. 1, the control system 100 includes a computer or processing system which operates to process sensor data that is obtained on the vehicle with respect to a road segment upon which the vehicle 10 operates. The sensor data can be used to determine actions which are to be performed by the vehicle 10 in order for the vehicle 10 to continue on a route to a destination. In some variations, the control system 100 can include other functionality, such as wireless communication capabilities, to send and/or receive wireless communications with one or more remote sources. In controlling the vehicle 10, the control system 100 can issue instructions and data, shown as commands 85, which programmatically controls various electromechanical interfaces of the vehicle 10. The commands 85 can serve to control operational aspects of the vehicle 10, including propulsion, braking, steering, and auxiliary behavior (e.g., turning lights on).

The AV 10 can be equipped with multiple types of sensors 101, 103, 105 which combine to provide a computerized perception of the space and environment surrounding the vehicle 10, including 360 degree video, sound, and 3D volumetric data of the environment. In addition, the AV 10 can be equipped with internal sensors 106 to provide a computerized perception of the space and environment inside the vehicle 10, including relative locations of vehicle riders and their personal possessions. Likewise, the control system 100 can operate within the AV 10 to receive sensor data from the collection of sensors 101, 103, 105, 106 and to control various electromechanical interfaces for operating the vehicle on roadways.

In more detail, the sensors 101, 103, 105, 106 operate to collectively obtain a complete sensor view of the vehicle 10, and further to obtain situational information inside and proximate to the vehicle 10, including any potential hazards in a forward operational direction of the vehicle 10. By way of example, the sensors 101, 103, 105 can include multiple sets of camera sensors 101 (video camera, stereoscopic pairs of cameras or depth perception cameras, long range cameras), remote detection sensors 103 such as provided by radar or LIDAR, proximity or touch sensors 105, and/or sonar sensors, any of which can be provided as internal sensors 106 inside the vehicle 10.

Each of the sensors 101, 103, 105, 106 can communicate with the control system 100 utilizing a corresponding sensor interface 110, 112, 114, 116. Each of the sensor interfaces 110, 112, 114, 116 can include, for example, hardware and/or other logical component which is coupled or otherwise provided with the respective sensor. For example, the sensors 101, 103, 105, 106 can include a video camera and/or stereoscopic camera set which continually generates image data of an environment, either internal or external, of the vehicle 10. As an addition or alternative, the sensor interfaces 110, 112, 114, 116 can include a dedicated processing resource, such as provided with a field programmable gate array ("FPGA") which can, for example, receive and/or process raw image data from the camera sensor.

In some examples, the sensor interfaces 110, 112, 114, 116 can include logic, such as provided with hardware and/or programming, to process raw sensor data 99 from a respective sensor 101, 103, 105, 106. The raw sensor data 99 after processing can be outputted as sensor data 111. As an addition or variation, the control system 100 can also include logic for processing raw sensor data 99.

According to one implementation, the vehicle interface subsystem 90 can include or control multiple interfaces to control mechanisms of the vehicle 10. The vehicle interface subsystem 90 can include a propulsion interface 92 to electrically (or through programming) control a propulsion component (e.g., an accelerator pedal), a steering interface 94 for a steering mechanism, a braking interface 96 for a braking component, and a lighting/auxiliary interface 98 for exterior lights of the vehicle. The vehicle interface subsystem 90 and/or the control system 100 can include one or more controllers 84 which can receive one or more commands 85 from the control system 100. The commands 85 can include route information 87 and one or more operational parameters 89 which specify an operational state of the vehicle 10 (e.g., desired speed and pose, acceleration, etc.).

The controller(s) 84 can generate control signals 119 in response to receiving the commands 85 for one or more of the vehicle interfaces 92, 94, 96, 98. The controllers 84 can use the commands 85 as input to control propulsion, steering, braking, and/or other vehicle behavior while the AV 10 follows a current route. Thus, while the vehicle 10 actively drives along the current route, the controller(s) 84 can continuously adjust and alter the movement of the vehicle 10 in response to receiving a corresponding set of commands 85 from the control system 100. Absent events or conditions which affect the confidence of the vehicle 10 in safely progressing along the route, the control system 100 can generate additional commands 85 from which the controller(s) 84 can generate various vehicle control signals 119 for the different interfaces of the vehicle interface subsystem 90.

According to examples, the commands 85 can specify actions to be performed by the vehicle 10. The actions can correlate to one or multiple vehicle control mechanisms (e.g., steering mechanism, brakes, etc.). The commands 85 can specify the actions, along with attributes such as magnitude, duration, directionality, or other operational characteristic of the vehicle 10. By way of example, the commands 85 generated from the control system 100 can specify a relative location of a road segment which the AV 10 is to occupy while in motion (e.g., change lanes, move into a center divider or towards shoulder, turn vehicle, etc.). As other examples, the commands 85 can specify a speed, a change in acceleration (or deceleration) from braking or accelerating, a turning action, or a state change of exterior lighting or other components. The controllers 84 can translate the commands 85 into control signals 119 for a corresponding interface of the vehicle interface subsystem 90. The control signals 119 can take the form of electrical signals which correlate to the specified vehicle action by virtue of electrical characteristics that have attributes for magnitude, duration, frequency or pulse, or other electrical characteristics.

In an example of FIG. 1, the control system 100 can include motion prediction logic 121, a route planner 122, event logic 124, a vehicle control 128, and a service control 146. The vehicle control 128 represents logic that converts alerts of event logic 124 ("event alert 135") into commands 85 that specify a set of vehicle actions. The service control 146 represents logic that provides an interface to a virtual reality programming layer that converts real-time inputs from the control system 100 to generate virtual reality content (audio, visual, etc.) for output systems 95. In addition, the service control 146 can manage computing resources available to the vehicle 10. For example, service control 146 can divert extra computing power that the vehicle 10 is not using in order to provide an improved virtual reality experience to riders in the vehicle 10.

Additionally, the route planner 122 can select one or more route segments 131 that collectively form a path of travel for the AV 10 when the vehicle 10 is on a current trip (e.g., servicing a pick-up request). In one implementation, the route planner 122 can specify route segments 131 of a planned vehicle path which defines turn by turn directions for the vehicle 10 at any given time during the trip. The route planner 122 may utilize the sensor interface 110 to receive GPS information as sensor data 111. The vehicle control 128 can process route updates from the route planner 122 as commands 85 to progress along a path or route using default driving rules and actions (e.g., moderate steering and speed).

In some aspects, virtual reality services, such as provided through service control 146, can assist in the selection of route segments 131 in order to more closely match virtual reality content. For example, given a choice between routes from a pick-up location to a destination, a virtual reality service can prefer routes that offer smoother rides with fewer turns and acceleration events. A virtual reality touring service, in contrast, may prefer routes that take the vehicle 10 closer to points of interest such as famous landmarks, historical districts, and other locations programmed into the touring service that offer features such as virtual reality overlays and fixed cameras. In other aspects, the virtual reality services can provide route options to a rider or choose a route based on the rider's saved preferences stored in a user profile.

According to examples described herein, the control system 100 can further include motion prediction logic 121 to estimate forces that riders of the vehicle 10 may experience during a ride. Motion prediction logic 121 can combine known information about the route segments 121 with real-time sensor data 111 for present conditions in order to create probabilistic acceleration profiles 133, which it provides to virtual reality services associated with the vehicle 10. Virtual reality services can then realistically incorporate the future motion predictions into content for gaming and overlay features presented to a rider or riders through various output devices.

In some aspects, at the start of a ride, motion prediction logic 121 can retrieve stored map data corresponding to the various route segments 131 of the ride and estimate the future motion trajectory of the rider. In conjunction with the map data, the estimates can also take factors such as the time of day and probable traffic conditions into account. These estimates can form a baseline probabilistic acceleration profile 133 for the ride. During operation of the vehicle 10, as new sensor data 111 becomes available from sensors 101, 103, 105, 106 onboard the vehicle 10, sensors on other vehicles, and stationary sensors placed in the world, motion prediction logic 121 can update estimates of the ride's future motion trajectory and update the probabilistic acceleration profile 133 accordingly. Motion prediction logic 121 can provide virtual reality services with probabilistic acceleration profiles 133 on various time scales and granularities depending on available computing power, precision of available data, content requirements, and other factors. For example, motion prediction logic 121 can estimate the future motion trajectory of the rider over the next five, ten, or twenty seconds.

In certain implementations, the event logic 124 can trigger a response to a detected event. A detected event can correspond to a roadway condition or obstacle which, when detected, poses a potential hazard or threat of collision to the vehicle 10. By way of example, a detected event can include an object in the road segment, heavy traffic ahead, and/or wetness or other environmental conditions on the road segment. The event logic 124 can use sensor data 111 from cameras, LIDAR, radar, sonar, or various other image or sensor component sets in order to detect the presence of such events as described. For example, the event logic 124 can detect potholes, debris, objects projected to be on a collision trajectory, and the like. Thus, the event logic 124 can detect events which enable the control system 100 to make evasive actions or plan for any potential threats.

When events are detected, the event logic 124 can signal an event alert 135 that classifies the event and indicates the type of avoidance action to be performed. Event logic 124 can additionally provide event alert 135 and corresponding avoidance actions to the motion prediction logic 121 to update the probabilistic acceleration profile 133, thereby allowing virtual reality services to incorporate the anticipated events or avoidance actions into content for a rider's current virtual reality experience. For example, if the event logic 124 detects that the vehicle 10 is likely to run over a large pothole and jostle the rider in two seconds, a virtual reality game can incorporate the jostling as a tremor, explosion, or other narrative device as appropriate.

In addition to motion planning, service control 146 can also feed other sensor data 111 to virtual reality services, such as estimates of body position, personal object volumes (i.e., a briefcase, purse, or bag) surrounding free space, and the body positions and personal object volumes of any surrounding riders in the vehicle 10.

The output systems 95 can include control systems for virtual reality devices such as head-mounted display units worn by riders in the vehicle 10. Output systems 95 can provide visual and audio content for the virtual reality devices. In addition, a vehicle 10 can be equipped with specialized output devices for virtual reality experiences that engage a rider's other senses, such as with tactile, haptic, or force feedback controls and seats.

Service control 146 can also manage utilization of the AV's computing resources by dividing the computing resources (e.g., processing power for game logic or graphical rendering, memory, etc.) between AV functionality and VR functionality, providing extra resources to gaming and overlay features when the vehicle 10 does not require those resources for sensors, data processing, or vehicle control 128 features. In some examples, output systems 95 and/or the virtual reality devices can include separate computing resources dedicated to virtual reality services, and service control 146 can supplement these dedicated resources from the general computing resources of the vehicle 10 as available. For example, a virtual reality game may render scenes at a higher resolution when computing resources from the vehicle 10 are available and scale down scenes when they are not available.

Figure 2:
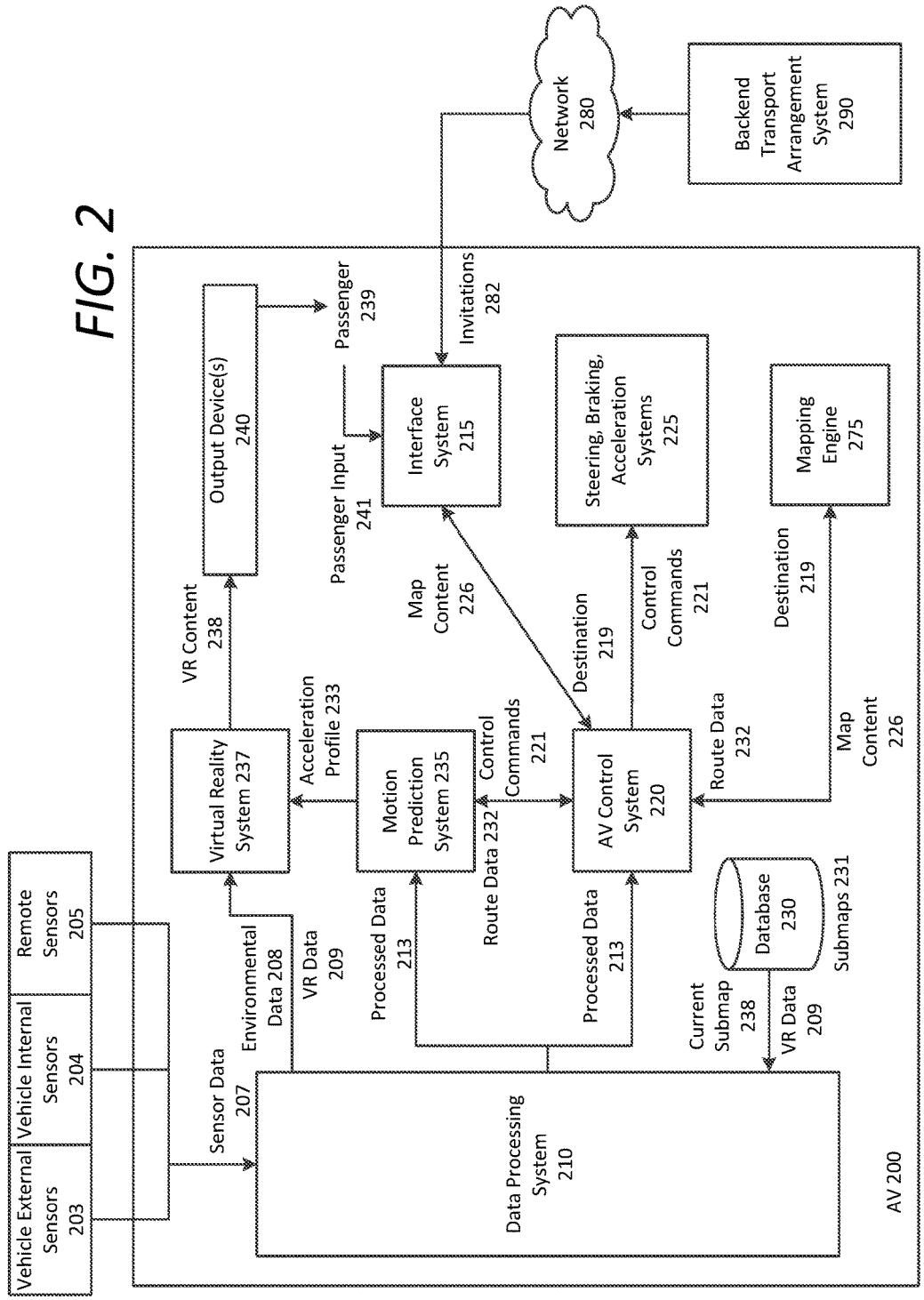
FIG. 2 is a block diagram illustrating an example autonomous vehicle including motion prediction and virtual reality systems, as described herein.

FIG. 2 is a block diagram illustrating an example autonomous vehicle including motion prediction and virtual reality systems, as described herein. The AV 200 shown in FIG. 2 can include some or all aspects and functionality of the autonomous vehicle 10 described with respect to FIG. 1.

Referring to FIG. 2, the AV control system 220 can receive a destination 219 from, for example, an interface system 215 of the AV 200. The interface system 215 can include any number of touch-screens, voice sensors, mapping resources, etc., that enable a rider 239 to provide a rider input 241 indicating the destination 219. For example, the rider 239 can type the destination 219 into a mapping engine 275 of the AV 200, or can speak the destination 219 into the interface system 215. Additionally or alternatively, the interface system 215 can include a wireless communication module that can connect the AV 200 to a network 280 to communicate with a backend transport arrangement system 290 to receive invitations 282 to service a pick-up or drop-off request. Such invitations 282 can include the destination 219 (e.g., a pick-up location), and can be received by the AV 200 as a communication over the network 280 from the backend transport arrangement system 290. In many aspects, the backend transport arrangement system 290 can manage routes and/or facilitate transportation for users using a fleet of autonomous vehicles throughout a given region. The backend transport arrangement system 290 can be operative to facilitate rider pick-ups and drop-offs to generally service pick-up requests, facilitate delivery such as packages or food, and the like.

Based on the destination 219 (e.g., a pick-up location), the AV control system 220 can utilize the mapping engine 275 to receive route data 232 indicating a route to the destination 219. In variations, the mapping engine 275 can also generate map content 226 dynamically indicating the route traveled to the destination 219. The route data 232 and/or map content 226 can be utilized by the AV control system 220 to maneuver the AV 200 to the destination 219 along the selected route. For example, the AV control system 220 can dynamically generate control commands 221 for the autonomous vehicle's steering, braking, and acceleration system 225 to actively drive the AV 200 to the destination 219 along the selected route. Optionally, the map content 226 showing the current route traveled can be streamed to the interior interface system 215 so that the rider(s) 239 can view the route and route progress in real time.

In addition to using route data 232 for guiding the AV 200, the AV control system 220 can send the route data 232 to a motion prediction system 235 to estimate the future motion trajectory of riders during the ride to destination 219. Route data 232 can include information such as the expected duration of the ride, turns and other expected vehicle movement, the time between such movements, etc., any combination of which the motion prediction system 235 can use to construct an acceleration profile 233 of the ride that represents the forces that riders of the AV 200 may experience at various points along the route segments to the destination 219. Motion prediction system 235 can then provide the acceleration profile 233 to a virtual reality system 237. During the ride, motion prediction system 235 can continue to update the acceleration profile 233 using real-time data from various sensors and provide the updated acceleration profiles 233 to the virtual reality system 237.

In some aspects, virtual reality system 237 represents a computing platform, software framework, or set of application programming interfaces that make the acceleration profile 233 and other AV 200 data available to virtual reality services such as games. Thus, virtual reality system 237 enables these VR services to access a rider's future physical motion trajectory to provide VR content 238, including visual and/or auditory experiences, that realistically incorporate that motion trajectory and minimize motion sickness induced by entrainment stimulus or by motion forces. In some examples, data processing system 210 can determine likely future ambient sounds around the AV 200 that a rider might hear, which VR services can incorporate into VR content 238.

In addition, the virtual reality system 237 can provide information that may be particularly interesting to the rider from online databases, gaming services, other vehicles, and stationary sensors placed to provide enhanced views of points of interest. Virtual reality system 237 can also provide in-vehicle data such as the positions of riders, the available free space around the riders, and the position and texture of any surfaces within reach of the riders for use in enhancing and tailoring VR content 238.

In many implementations, the AV 200 can include a sensor array that can provide sensor data 207 to an on-board data processing system 210. As described herein, the sensor array can include any number of active or passive sensors that continuously detect a situational environment of the AV 200. For example, vehicle external sensors 203 can include a number of camera sensors (e.g., stereo cameras), LIDAR sensor(s), proximity sensors, radar, and the like to detect the environment outside of the AV 200. In addition, AV 200 can include vehicle internal sensors 204 of types similar to the external sensors that can be used to track riders and objects inside of the AV 200. The data processing system 210 can utilize the sensor data 207 to detect the situational conditions of the AV 200 as the AV 200 travels along a current route.

For example, the data processing system 210 can identify potential obstacles or road hazards—such as pedestrians, bicyclists, objects on the road, road cones, road signs, animals, etc.—in order to enable an AV control system 220 to react accordingly. Sensor data 207 can also include data from remote sensors 205 that are not provided on AV 200. For example, AV 200 can receive camera feeds from fixed cameras at various points of interest in a city or sensor data 207 from other vehicles on the road.

In certain implementations, the data processing system 210 can utilize sub-maps 231 stored in a database 230 of the AV 200 (or accessed remotely from the backend system 290 via the network 280) in order to perform localization and pose operations to determine a current location and orientation of the AV 200 in relation to a given region (e.g., a city).

The data sub-maps 231 in the database 230 can comprise previously recorded sensor data, such as stereo camera data, radar maps, and/or point cloud LIDAR maps. The sub-maps 231 can enable the data processing system 210 to compare the sensor data 207 from the sensor array with a current sub-map 238 to identify obstacles and potential road hazards in real time. The data processing system 210 can provide the processed sensor data 213, which can be a subset of environmental data 208 identifying such obstacles and road hazards, to the AV control system 220, which can react accordingly by operating the steering, braking, and acceleration systems 225 of the AV 200 to perform low level maneuvering.

While the AV control system 220 operates the steering, braking, and acceleration systems 225 along the current route on a high level, the processed data 213 provided to the AV control system 220 can indicate low level occurrences, such as obstacles and potential hazards, to which the AV control system 220 can make decisions and react. For example, the processed data 213 can indicate a pedestrian crossing the road, traffic signals, stop signs, other vehicles, road conditions, traffic conditions, bicycle lanes, crosswalks, pedestrian activity (e.g., a crowded adjacent sidewalk), and the like. The AV control system 220 can respond to the processed data 213 by generating control commands 221 to reactively operate the steering, braking, and acceleration systems 225 accordingly. In order to better predict future motion trajectories and update acceleration profile 233, the AV control system 220 can also provide control commands 221 to the motion prediction system 235. For example, if AV control system 220 generates a control command 221 to turn left to avoid a pothole in the road up ahead, virtual reality services may be able to incorporate the left turn into VR content 238 or otherwise compensate for the left turn in real-time.

In addition to providing the processed data 213 to AV control system 220, the data processing system 210 can also provide processed data 213 to the motion prediction system 235 to predict future motion trajectories and update acceleration profile 233 during the ride.

In accordance with aspects disclosed, the virtual reality system 237 retrieves environmental data 208 that may be particularly interesting to riders from online databases, gaming services, other vehicles, and stationary sensors placed to provide enhanced views of points of interest. In addition, environmental data 208 can include data from the vehicle internal sensors 204 that track body positions of riders, the available free space around the riders, and the position and texture of any surfaces within reach of the riders, any of which the virtual reality system 237 can use for use in enhancing and tailoring VR content 238. As new data (i.e., through environmental data 208 or updated acceleration profiles 233) become available, virtual reality system 237 can provide updated estimates of the rider's future motion trajectory, likely future ambient sounds, body position, personal object volumes (e.g., a briefcase, purse, or bag), surrounding free space, and the body positions and personal object volumes of any surrounding riders. Virtual reality system 237 can provide these updates in real-time through features of a VR platform or in response to requests from VR services made through various application programming interfaces (APIs) that virtual reality system 237 exposes to the VR services. In some examples, the VR services can execute on a passenger device, and an externally facing API can provide access to virtual reality system 237 via secure access channels through any number of methods, such as Representational State Transfer (REST), Simple Object Access Protocol (SOAP), remote procedure call (RPC), scripting access, etc.

In one aspect, environmental data 208 can include tourist-centric content such as live feeds of points of interest from cameras, live feeds of the AV 200 cameras, and curated content stored in database 230 as VR data 209. Virtual reality system 237 can enhance a rider's view of a surrounding city by offering the rider tourist information as a virtual overlay of the real city around them. For example, a rider in a regular vehicle can only partially observe a landmark such as the Arc de Triomphe as the vehicle drives by. It may or may not be visible to the rider depending on where the rider is seated, the type of vehicle, other passengers, other traffic, or light/weather conditions. To give passenger 239 of AV 200 a better view, virtual reality system 237 can provide a touring overlay to output device 240 that allows the passenger 239 to turn their head towards the arch and see what the camera above the AV 200 sees. Depending on environmental data 208 available from the AV 200 and VR data 209, passenger 239 can also select enhanced renditions of the arch. For example, passenger 239 could choose a perfect lighting and unobscured rendition or a historical rendition of the arch during construction or a historical event.

Virtual reality system 237 can provide unaltered views from the AV 200 cameras as real-time video to output device 240. Alternatively, extra VR content 238 can be overlaid on features (e.g., buildings, points of interest) or overlaid on the AV 200 itself. In some examples, virtual reality system 237 can use the real-time video combined with 3D volumetric data from external sensors 203 to render a virtual depiction of the environment with modified or additional content overlays. In one aspect, the virtual reality system 237 can identify a point of interest in the environment around the AV 200 from sensor data 207, retrieve a content overlay associated with that point of interest, and render a virtual depiction of the point of interest using the content overlay. Real parts of the environment can be stylized to match a theme or narrative of VR content, or they can be stylized in conjunction with rider preferences saved as VR data 209 in database 230. In addition to video, VR content 238 can include audio content, such as descriptions of the local landmarks visible to passenger 239.

In other aspects, a virtual reality gaming service running on the virtual reality system 237 platform can construct VR content 238 with a scenario and narrative arc compatible with the player's motion and surroundings. For instance if other riders are seated next to the player wearing a VR headset, the gaming service can provide a virtual scenario that shows virtual surfaces or obstacles at the boundaries of the space assigned to the player so that the player does not accidentally hit other riders. The gaming service can also design the narrative arc of the gaming experience so that the motions the player experiences in the virtual world match the physical motions they experience and their body position in the virtual world is compatible with their physical body position within the AV 200. As a result, distracting and undesirable acceleration forces and other stimuli on the player experienced during the ride inside AV 200 are turned into parts of the game.

The gaming service can also use the body positions of surrounding riders to allow the player to maintain situational awareness while being immersed in a virtual experience. For example, the player may be able to see a representation of other riders' limbs and possessions to avoid colliding with them and also monitor whether another rider is accessing their personal possessions. In one example, the gaming service can warn the player, either through the gaming API or with a direct communication, if another rider is detected accessing the player's possessions.

Methodology

Figure 3:
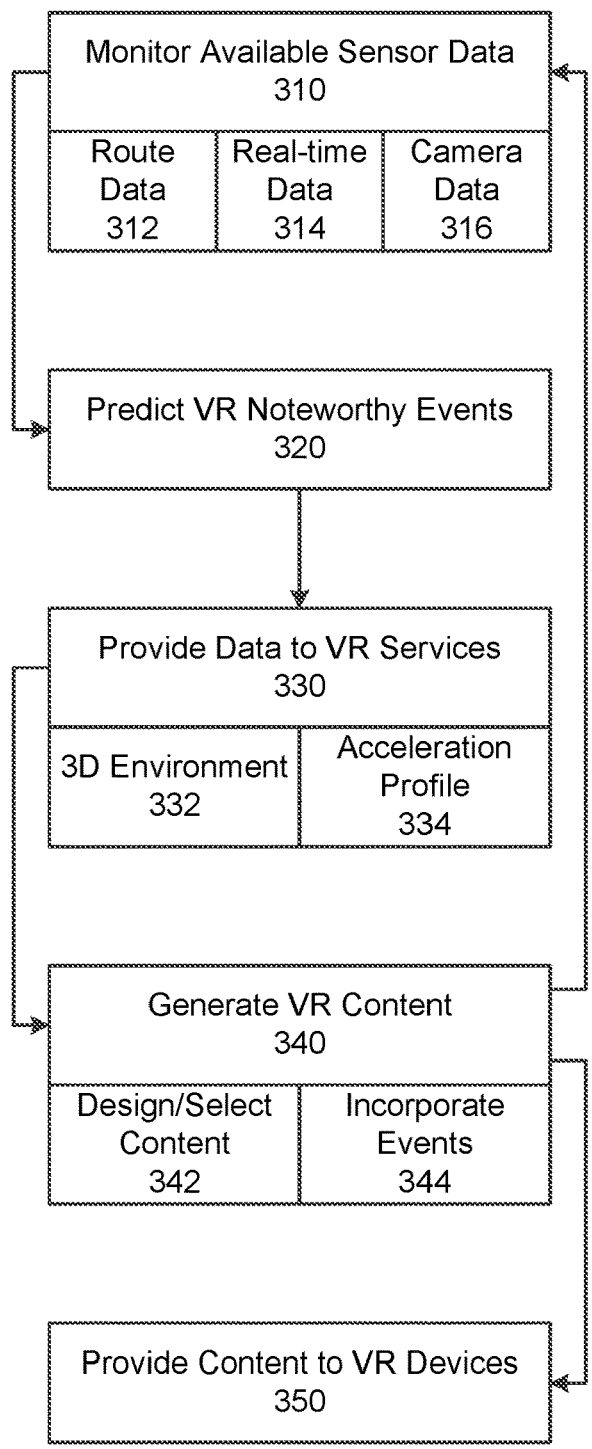
FIG. 3 is a flow chart describing example methods of a virtual reality system in a vehicle in accordance with example implementations.

FIG. 3 is a flow chart describing example methods of a virtual reality system in a vehicle in accordance with example implementations. While operations of the method are described below as being performed by specific components, modules, or systems described in FIGS. 1 and 2, it will be appreciated that these operations need not necessarily be performed by the specific components identified, and could be performed by a variety of components and modules, potentially distributed over a number of machines. Accordingly, references may be made to elements of vehicle 10 and AV 200 for the purpose of illustrating suitable components or elements for performing a step or sub step being described. Alternatively, at least certain ones of the variety of components and modules described in vehicle 10 and AV 200 can be arranged within a single hardware, software, or firmware component. It will also be appreciated that some of the steps of this method may be performed in parallel or in a different order than illustrated.

With reference to an example of FIG. 3, when a ride is requested, the vehicle can estimate the future motion trajectory of the rider and monitor real-time sensor data, which the vehicle can provide to virtual reality services in order to tailor VR content for the ride. During the ride, the vehicle monitors various types of sensor data to dynamically construct accurate models of stimuli that a rider may experience (310).

The motion prediction system 235 can use route data 232 from the current location to the ride's destination to estimate the future motion trajectory of riders during the ride (312). Route data 232 can include information such as the expected duration of the ride, turns and other expected vehicle movement, the time between such movements, etc., any combination of which the vehicle can use to predict the forces that riders may experience at various points along the route segments to the destination.

In many implementations, the vehicle can include a sensor array that can provide sensor data 207 to an on-board data processing system 210. As described herein, the sensor array can include any number of active or passive sensors that continuously detect the real-time environment of the vehicle (314). For example, vehicle external sensors 203 can include LIDAR sensor(s), proximity sensors, radar, and the like to detect the environment outside of the vehicle. In addition, the vehicle can include vehicle internal sensors 204 of types similar to the external sensors that can be used to track riders and objects inside of the vehicle. The data processing system 210 can utilize the sensor data 207 to detect the situational conditions of the vehicle as the vehicle travels along a current route. For example, the data processing system 210 can identify potential obstacles or road hazards—such as pedestrians, bicyclists, objects on the road, road cones, road signs, animals, etc.—in order to enable an AV control system 220 to react accordingly. Sensor data 207 can also include images and video from cameras mounted on the vehicle, within the vehicle, and at fixed locations outside the vehicle such as at points of interest in a city (316).

Using the available sensor data, motion prediction system 235 can determine the impact of the sensor data on a virtual reality experience to predict VR noteworthy events, or stimuli that are determined to potentially interfere with in-vehicle virtual reality services or be useful for the services to incorporate into visual and/or auditory experiences (320). For example, motion prediction system 235 may predict a future hard left turn based on the route data 232 or real-time sensor data and classify the turn as a noteworthy event that should be provided to virtual reality services. In another example, motion prediction system 235 may predict that a slight left turn does not meet a programmed threshold to be considered noteworthy. In addition to using the available sensor data to determine noteworthy events, the AV control system 220 can also provide control commands 221 to the motion prediction system 235. For example, if AV control system 220 generates a control command 221 to turn left to avoid a pothole in the road up ahead, the motion prediction system 235 may classify the turn according to its programmed thresholds.

The motion prediction system 235 and vehicle sensors provide the VR noteworthy events and other sensor data to a virtual reality system 237. In some aspects, a virtual reality system 237 can provide available sensor data to virtual reality services without any filtering or regardless of noteworthiness. In some aspects, virtual reality system 237 represents a computing platform, software framework, or set of application programming interfaces that make sensor data, camera feeds, VR noteworthy events, etc. available to virtual reality services such as games (330). Thus, virtual reality system 237 enables these VR services to access a rider's future physical motion trajectory to provide VR content 238, including visual and/or auditory experiences, that realistically incorporate that motion trajectory and minimize motion sickness induced by entrainment stimulus or by motion forces.

The virtual reality system 237 can provide external environmental data 208 and camera feeds that may be particularly interesting to the rider from online databases, gaming services, other vehicles, and stationary sensors placed to provide enhanced views of points of interest (332). Virtual reality system 237 can also provide in-vehicle data such as the positions of riders, the available free space around the riders, and the position and texture of any surfaces within reach of the riders for use in enhancing and tailoring virtual reality experiences.

In some implementations, the motion prediction system 235 can provide acceleration profiles 233 to the virtual reality system 237 (334). During the ride, motion prediction system 235 can continue to update the acceleration profile 233 using real-time data from various sensors. As new data (i.e., through environmental data 208 or updated acceleration profiles 233) become available, virtual reality system 237 can provide updated estimates of the rider's future motion trajectory, likely future ambient sounds, body position, personal object volumes (e.g., a briefcase, purse, or bag), surrounding free space, and the body positions and personal object volumes of any surrounding riders. Virtual reality system 237 can provide these updates in real-time through features of a VR platform or in response to requests from VR services made through various application programming interfaces that virtual reality system 237 exposes to the VR services.

Using the acceleration profile 233, environmental data 208, and any other available sensor data, virtual reality services interfacing with the virtual reality system can generate VR content including visual and/or auditory experiences that realistically incorporate motion trajectory, minimize motion sickness induced by entrainment stimulus or by motion forces, and provide entertainment, communication, touring, gaming, news, advertising, and enhanced views of the local area around the rider, or other local areas compatible with the rider's physical motion (340).

In some aspects, virtual reality services can design or select a scenario and narrative arc that will be compatible with the rider's motion and surroundings for the expected duration of the ride (342). For example, a gaming service can design the narrative arc of the gaming experience so that the motions the player experiences in the virtual world match the physical motions they experience, and their body position in the virtual world is compatible with their physical body position. The gaming service can also use the body positions of surrounding riders to allow the player to maintain situational awareness while being immersed in a virtual experience. For instance the player could see a representation of other riders' limbs or personal volumes to avoid colliding with them, or to monitor if another rider may be accessing their personal objects.

As new data becomes available from sensors onboard the vehicle, sensors on other vehicles, and stationary sensors placed in the world, updated estimates of the rider's future motion trajectory, body position, personal object volumes (i.e. a briefcase, purse, or bag), surrounding free space, and the body positions and personal object volumes of any surrounding riders are provided to the gaming service. During the ride, the virtual reality system 237 continues to monitor available sensor data and predict VR noteworthy events so that the gaming service can update the VR content to incorporate the events into the game (344). As a result, distracting and undesirable acceleration forces and other stimuli on the player experienced during the ride are turned into parts of the game.

Virtual reality system 237 can provide the generated VR content (e.g., a rendered video stream of a game) to output devices 240 such as a head-mounted display unit worn by a rider in the vehicle (350). In one aspect, virtual reality system 237 can provide unaltered views from the AV 200 cameras as real-time video to output device 240. Alternatively, extra VR content 238 can be overlaid on features (e.g., buildings, points of interest) or overlaid on the AV 200 itself. In some examples, virtual reality system 237 can use the real-time video combined with 3D volumetric data from external sensors 203 to render a virtual depiction of the environment with modified or additional content overlays. In one aspect, the virtual reality system 237 can identify a point of interest in the environment around the AV 200 from sensor data 207, retrieve a content overlay associated with that point of interest, and render a virtual depiction of the point of interest using the content overlay. Real parts of the environment can be stylized to match a theme or narrative of VR content, or they can be stylized in conjunction with rider preferences saved as VR data 209 in database 230. In addition to video, VR content 238 can include audio content, such as descriptions of the local landmarks visible to passenger 239.

Figure 4:
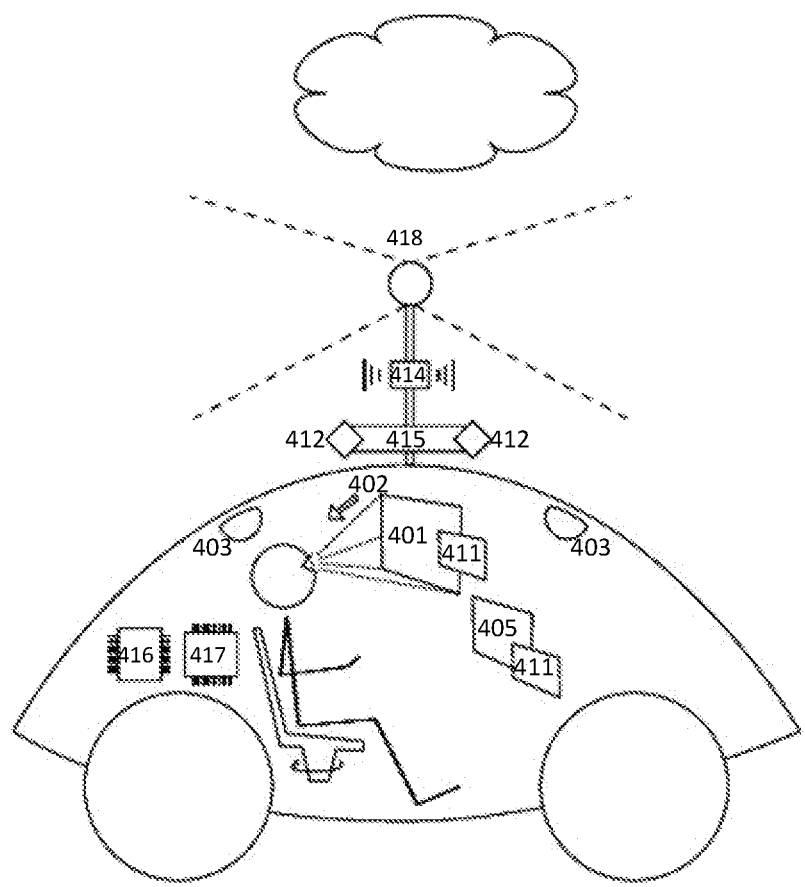
FIG. 4 illustrates an example implementation of an AV utilizing a virtual reality system, as described herein.

FIG. 4 illustrates an example implementation of an AV utilizing a virtual reality system, as described herein. As the AV travels along a current route, sensors within the AV can assist in configuring an environment for virtual reality, sensors within and fixed to the AV can provide data to a virtual reality system, and computer components of the AV can enable a platform and resources for in-vehicle virtual reality services. A rider in the AV can wear a virtual or augmented reality headset or other device, which is provided with enhanced 360 degree video, sound, and 3D volumetric data that the AV sensors record.

In some aspects, the AV provides a computing platform, software framework, or set of application programming interfaces (APIs) that make vehicle sensor data and other information available to virtual reality services such as games. Virtual reality services can execute on a rider's personal device (e.g., a laptop computer, tablet, or phone), a cloud-based system running remotely, computing resources equipped on the AV, or a combination of sources. These services can include a programming layer to interface with the AV's virtual reality system API in order to query for and retrieve AV data for use in generating and modifying virtual reality content as the developer of the service sees fit.

Virtual reality game logic may reside on a user's mobile phone and interface with a central processing unit (CPU) 416 and/or graphics processing unit (GPU) 417 on the AV to render a virtual presentation 401 for the game in a higher fidelity or resolution than possible on a mobile phone. CPU 416 can be a processor dedicated specifically for virtual reality use, or the AV can share CPU 416 between virtual reality use and other functions of the AV such as sensor data processing and vehicle controls. In a shared operating mode, a virtual reality system running on the AV can monitor and manage utilization of available computing resources (e.g., memory and CPU 416 cycles) that are not being used for essential functions of the AV and make these resources available for virtual reality services. When available, the extra AV computing resources can increase the quality of virtual reality experiences, including the virtual presentation 401. The virtual reality system can further trigger virtual reality services to scale content based on the extra AV computing resources available. For example, if the CPU 416 is under heavy load from vehicle control processing, the virtual presentation 401 can be rendered at a lower resolution or framerate until the vehicle control processing load is reduced.

In some implementations, the interior of the AV is configured as a car-scale virtual reality environment with known dimensions, seat locations, and sensor positions. Since the interior of the AV is a fixed space, positioning and calibration of sensors for the virtual reality environment can be performed for a fleet of AVs efficiently, and virtual reality content can be tailored to the fixed space. In addition, the internal sensors can create a 3D model of the interior of the vehicle and provide the model to virtual reality applications. In some examples, the 3D model can include information regarding the haptic texture of surfaces in the vehicle.

Within the environment, the AV can include head tracking sensors 402 and hand and body tracking sensors 403, among other types of sensors not illustrated (e.g., temperature, humidity, and light sensors). Head tracking sensors 402 monitor a rider's head, eyes, and ears relative to the environment for the virtual reality system, both in terms of position and orientation so that a virtual reality system can determine a direction in which the rider is looking. In some examples, head tracking sensors 402 can supplement or replace similar sensors that may be included in other virtual reality output devices. Hand and body tracking sensors 403 can monitor the body position, personal object volumes (e.g., a briefcase, purse, or bag), and surrounding free space of each rider in the AV. For example, if other riders are seated next to a rider wearing a head-mounted display, a virtual reality service can use sensor data from the hand and body tracking sensors 403 to generate virtual surfaces or obstacles at the boundaries of the space assigned to the rider so that the rider using the service does not accidentally hit other riders. Among other content, the virtual reality service can provide the virtual surfaces or obstacles as part of a visual overlay 411 on the virtual presentation 401 and/or a display 405. Hand and body tracking sensors 403 can also track a rider's motions for use in gesture recognition and input to the virtual reality services. In some examples, the AV can provide wired and wireless connections for virtual reality output devices such as head-mounted displays to connect to the virtual reality system running on the AV.

In addition to the internal sensors, an AV can be equipped with external sensors such as mapping sensors 412, audio sensors 414, and positioning sensors 415. These include sensors such as cameras (e.g., stereo cameras), LIDAR sensor(s), proximity sensors, radar, and the like to detect the environment outside of the AV, each of which can provide sensor data to a virtual reality system for use in designing and modifying virtual reality content. In some aspects, mapping sensors 412 on top of the AV collect 360 degree video of the world from a higher vantage point than is available to riders in a vehicle. The AV sensor system can provide this video to virtual presentation 401 and/or display 405, with or without an overlay 411 feature. Mapping sensors 412 can also detect other vehicles on the road, obstacles, potholes, etc. that may trigger vehicle control actions, motion events, and probable stimuli on riders that a virtual reality service can incorporate into VR content. Audio sensors 414 can include directional sound sensing devices that can provide audio content to virtual reality services. Positioning sensors 415 can include GPS and other sensors to determine a location for the AV. In one example, a virtual reality system can select content for landmarks depending on the location of the AV and then provide the content as an overlay 411 for a rider.

In some implementations, an AV can also include an emitter 418 on the exterior to assist in the accuracy of remote sensor functions. The emitter 418 can send out signals at any appropriate frequency and wavelength, for example as radio waves or infrared. Remote sensors in the environment can detect these signals in order to track the AV and other vehicles and people in the environment.

Figure 5:
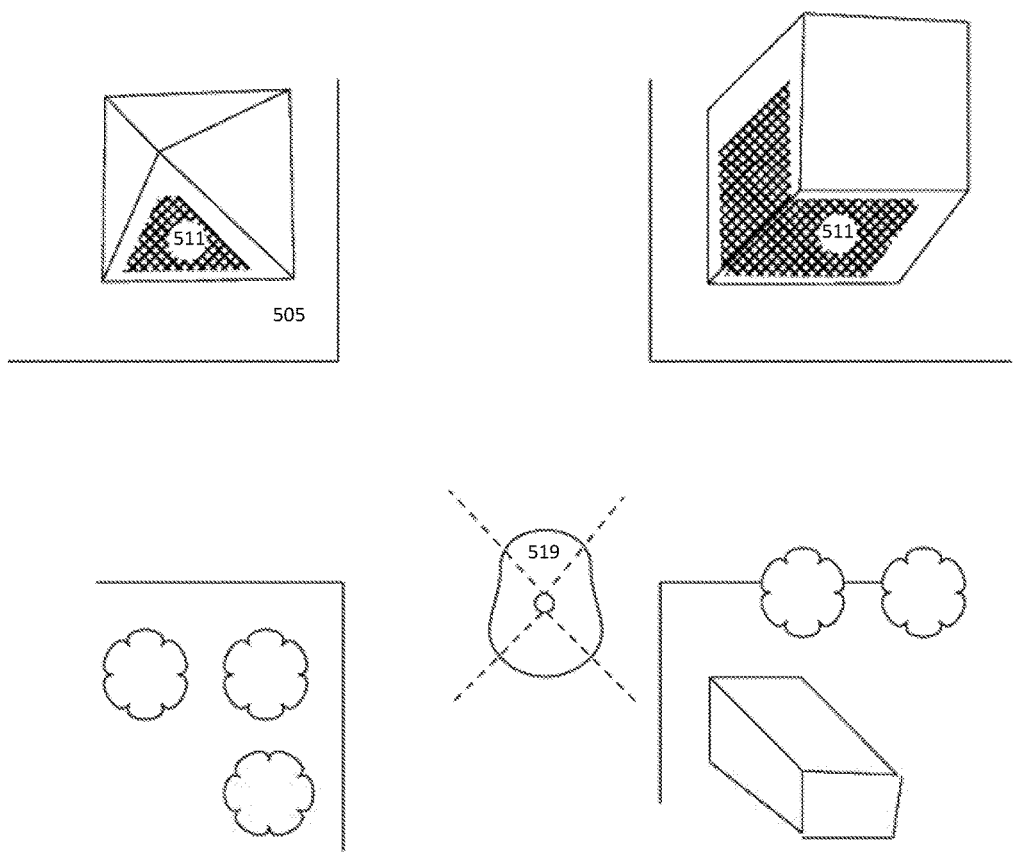
FIG. 5 illustrates an example implementation of virtual reality overlay features for riders of an autonomous vehicle, as described herein.

FIG. 5 illustrates an example implementation of virtual reality overlay features for riders of an autonomous vehicle, as described herein. In some examples, an AV equipped with a virtual reality system can provide riders with tourist-centric content such as live feeds of points of interest from cameras, live feeds of the AV cameras, and curated content stored in databases. With these sources of data, the virtual reality system can enhance a rider's view of a surrounding city by offering the rider tourist information as a virtual overlay on top of the real city around them. That is, the virtual reality system can display real-time video from cameras mounted on top of the AV and further overlay modified or additional content onto the video.

For example, a rider in a regular vehicle can only partially observe a landmark such as the Arc de Triomphe as the vehicle drives by. It may or may not be visible to the rider depending on where the rider is seated, the type of vehicle, other passengers, other traffic, or light/weather conditions.

To give the rider a better view, the virtual reality system can provide a touring overlay to an output device (e.g., a virtual reality head-mounted display unit) that allows the rider to turn their head towards the arch and see what the camera above the AV sees. Depending on environment data available from the AV, the rider can also select enhanced renditions of the arch. For example, the rider could choose a perfect lighting and unobscured rendition or a historical rendition of the arch during construction or a historical event.

As the AV 519 drives down the selected route, the AV 519 keeps track of its location, and the virtual reality system determines which content to display to a rider based on the current location of the AV 519 and any rider selections and preferences. In one example, head tracking AV sensors or sensors provided with a head-mounted display can determine a direction a rider is looking in and render the environment outside the AV in that direction. In some aspects, sensors on the AV 519 can receive overlay content from sources in the environment within an effective range. For example, certain points of interest can transmit video from stationary cameras that the virtual reality system can incorporate into a virtual depiction of the environment to provide the rider with views that would otherwise be unavailable from the AV 519. In other aspects, the AV 519 can retrieve overlay content 511 from databases, either remote or stored on the AV 519, based on location or identification of a known point of interest from processed sensor data. The virtual reality system can also use user preferences, such as stored with a profile on a rider's device, to determine overlay content 511.

In one aspect, the virtual reality system can provide unaltered views from the AV cameras as real-time video to output devices. Alternatively, virtual reality content 511 can be overlaid on features (e.g., buildings, points of interest) or overlaid on the AV itself. In some examples, the virtual reality system can use the real-time video combined with 3D volumetric data from AV sensors to render a virtual depiction of the environment with modified or additional content overlays. In one aspect, the virtual reality system can identify a point of interest in the environment around the AV 519 from sensor data, retrieve a content overlay associated with that point of interest, and render a virtual depiction of the point of interest using the content overlay. Real parts of the environment can be stylized to match a theme or narrative of VR content, or they can be stylized in conjunction with rider preferences. In one example, the virtual reality system can overlay descriptive information or advertising content 511 on sides of buildings as the AV 519 transports a rider through a city. In addition, real parts of the environment could be stylized to match an overall theme or narrative, or they could be stylized in conjunction with passenger preferences. In addition to video, virtual reality content can include audio, such as descriptions of the local landmarks visible to a rider, which the rider can select to listen to through the virtual reality system.

In some implementations, remote sensors 505 in the environment can detect signals emitted from the AV 519 (e.g., radio waves, infrared, radar, visible light) in order to assist in the accuracy of remote sensor 505 functions. Once detected, the remote sensor 505 can send its sensor data back to the AV 519. In some examples, the sensor data can include 3D data of other vehicles and people in the environment and precise positioning and vector information for the AV 519. The remote sensor 505 can transmit the sensor data directly to the AV 519 or to a remote database that the AV 519 can access. In one aspect, remote sensors 505 form a mesh network with each other and any vehicles in the environment, which can be used for exchange of sensor data. For example, AV 519 and a remote sensor 505 can use Dedicated Short Range Communications (DSRC) or similar technology to transmit positioning, vector, and other information between vehicles and the remote sensors 505.

Figure 6:
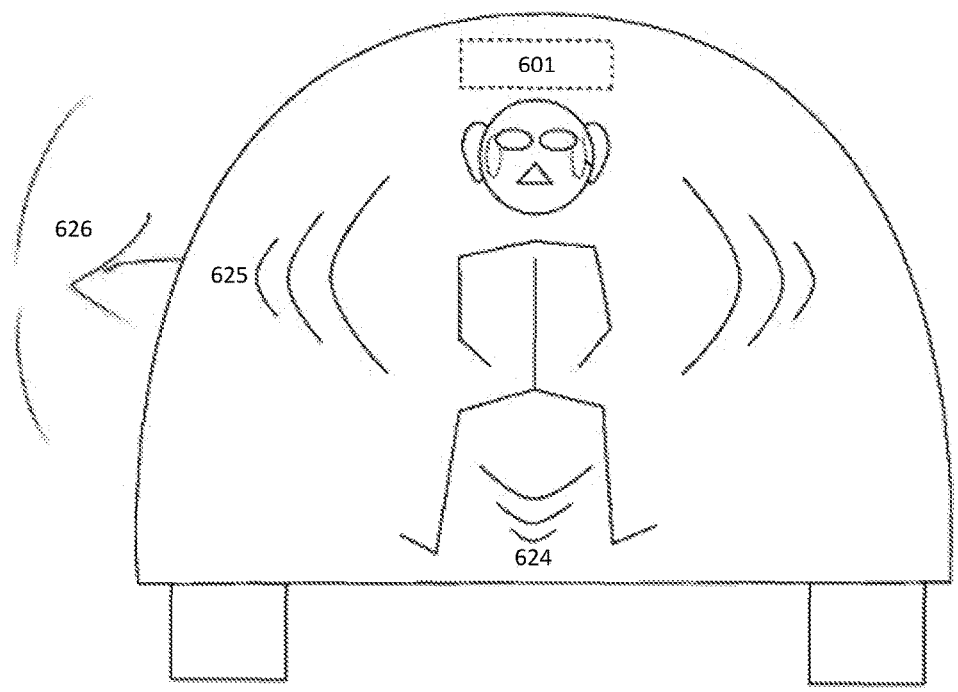
FIG. 6 illustrates an example implementation of an AV utilizing a motion prediction system, as described herein.

FIG. 6 illustrates an example implementation of an AV utilizing a motion prediction system, as described herein. Using sensor data available to the AV, virtual reality services interfacing with the virtual reality system can generate VR content including visual and/or auditory experiences that realistically incorporate motion trajectory, minimize motion sickness induced by entrainment stimulus or by motion forces, and provide entertainment, communication, touring, gaming, news, advertising, and enhanced views of the local area around the rider, or other local areas compatible with the rider's physical motion.

In some aspects, virtual reality services can design or select a scenario and narrative arc that will be compatible with the rider's motion and surroundings for the expected duration of the ride. For example, a gaming service can design the narrative arc of the gaming experience so that the motions the player experiences in the virtual world match the physical motions they experience, and their body position in the virtual world is compatible with their physical body position.

As new data becomes available from sensors onboard the vehicle, sensors on other vehicles, and stationary sensors placed in the world, updated estimates of the rider's future motion trajectory, body position, personal object volumes (i.e. a briefcase, purse, or bag), surrounding free space, and the body positions and personal object volumes of any surrounding riders are provided to the gaming service. During the ride, the virtual reality system continues to monitor available sensor data and predict VR noteworthy events so that the gaming service can update the VR content to incorporate the events into the game. As a result, distracting and undesirable motion forces such as gravitational forces 624, lateral forces 625, and acceleration forces 626 from the vehicle that the player may experience during the ride are turned into parts of the game. The virtual reality system can provide the generated VR content (e.g., a rendered video stream of a game) to output device 601, such as a head-mounted display unit worn by a rider in the vehicle.

Figure 7:
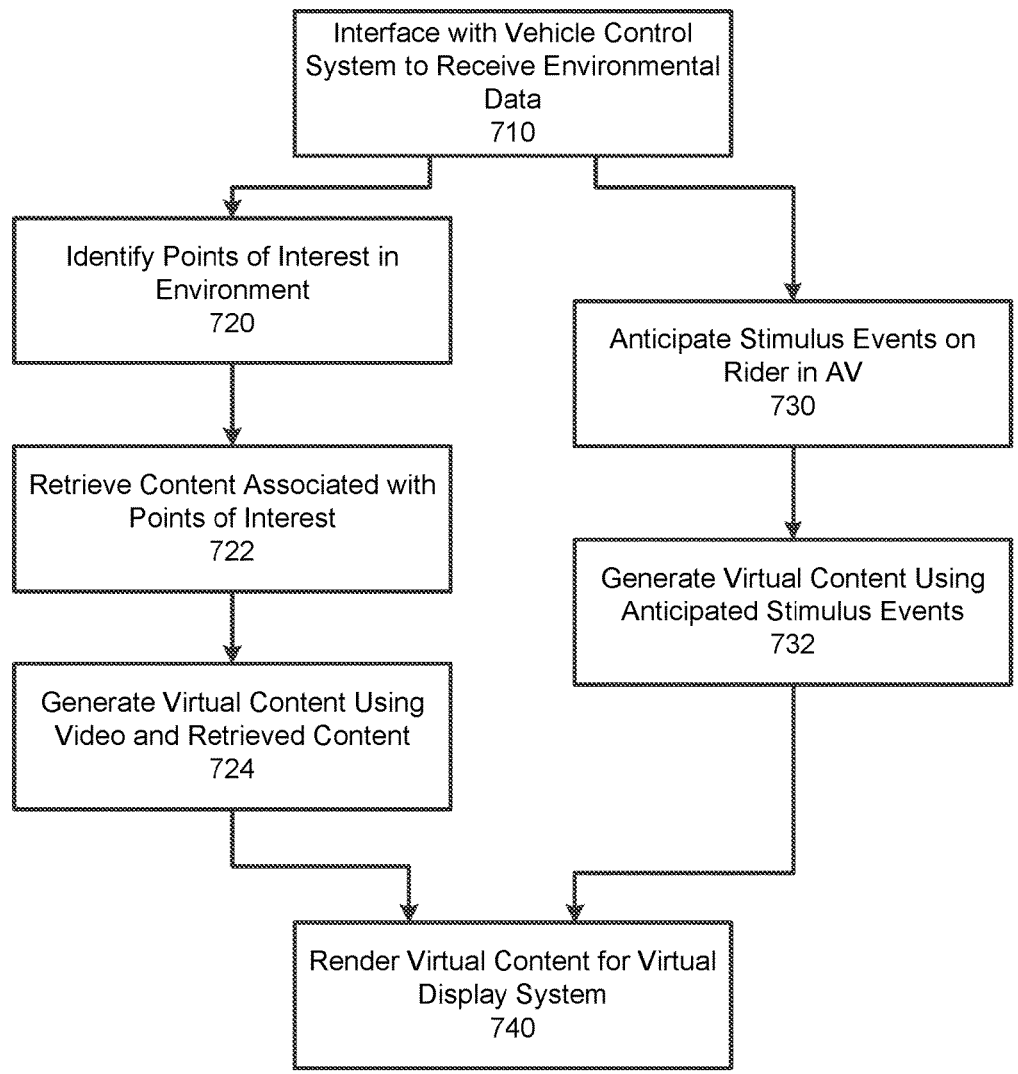
FIG. 7 is a flow chart describing example methods of rendering virtual content in a vehicle in accordance with example implementations.

FIG. 7 is a flow chart describing example methods of rendering virtual content in a vehicle in accordance with example implementations. In some aspects, a virtual reality system can interface with the vehicle control system (e.g., control system 100 described with FIG. 1) to receive environmental data while the AV is being operated autonomously by the vehicle control system through an environment (710).

In one example, the virtual reality system can identify, from the environmental data, a point of interest in the environment around the AV (720). In this example, the environmental data can include real-time video of the environment from one or more cameras on the AV. The virtual reality system can retrieve content associated with the point of interest from one or more databases which can be accessed over a network or stored within the AV itself (722). With the content retrieved, the virtual reality system can generate virtual content for the virtual display system using at least the video and at least part of the retrieved content associated with the point of interest (724).

In another example, the virtual reality system can analyze the environmental data to anticipate stimulus events which represent probabilistic environmental stimuli on a rider in the AV on a road segment (730). In some aspects, at least some of the environmental data is generated by acceleration sensors and at least some of the environmental data is route data for the road segment, which the vehicle control system can retrieve from a database of route data. The virtual reality system can then generate virtual content for the virtual display system based on at least the stimulus events (732).

The virtual reality system can further render the generated virtual content for a virtual display system, such as a head-mounted display unit worn by a rider in the AV (740).

Hardware Diagram

Figure 8:
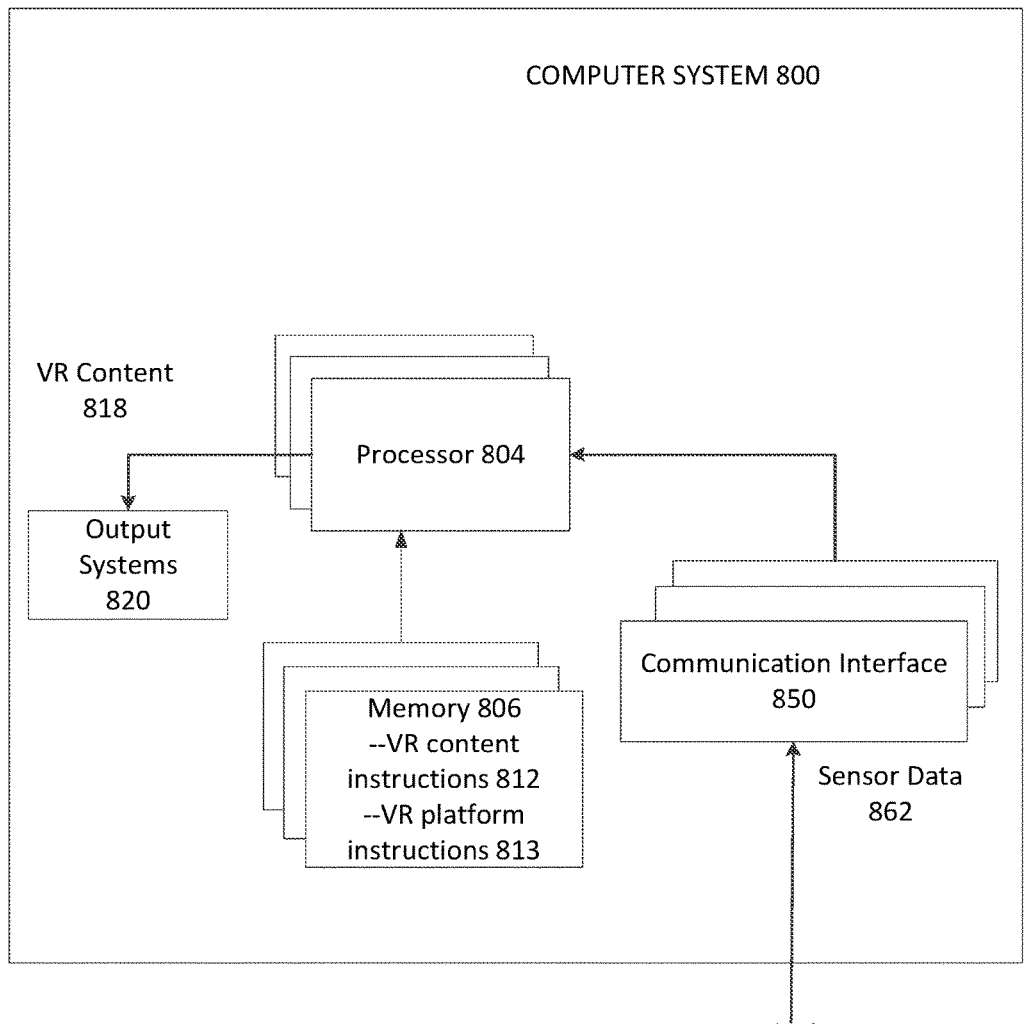
FIG. 8 is a block diagram illustrating a computer system upon which examples described herein may be implemented.

FIG. 8 is a block diagram illustrating a computer system upon which examples described herein may be implemented. For example, the motion prediction system 235 and virtual reality system 237 shown and described with respect to FIG. 2 may be implemented on the computer system 800 of FIG. 8. The computer system 800 can be implemented using one or more processors 804, and one or more memory resources 806. In the context of FIG. 2, the motion prediction system 235 and virtual reality system 237 can be implemented using one or more components of the computer system 800 shown in FIG. 8.

According to some examples, the computer system 800 may be implemented within an autonomous vehicle with software and hardware resources such as described with examples of FIGS. 1 and 2. In an example shown, the computer system 800 can be distributed spatially into various regions of the autonomous vehicle, with various aspects integrated with other components of the autonomous vehicle itself. For example, the processors 804 and/or memory resources 806 can be provided in the trunk of the autonomous vehicle. The various processing resources 804 of the computer system 800 can also execute VR content instructions 812 and platform instructions 813 using microprocessors or integrated circuits. In some examples, the VR content instructions 812 and platform instructions 813 can be executed by the processing resources 804 or using field-programmable gate arrays (FPGAs).

In an example of FIG. 8, the computer system 800 can include a local communication interface 850 (or series of local links) to vehicle interfaces and other resources of the autonomous vehicle (e.g., the computer stack drives). In one implementation, the communication interface 850 provides a data bus or other local links to electro-mechanical interfaces of the vehicle, such as wireless or wired links to the AV control system 220.

The memory resources 806 can include, for example, main memory, a read-only memory (ROM), storage device, and cache resources. The main memory of memory resources 806 can include random access memory (RAM) or other dynamic storage device, for storing information and instructions which are executable by the processors 804. The processors 804 can execute instructions for processing information stored with the main memory of the memory resources 806. The main memory 806 can also store temporary variables or other intermediate information which can be used during execution of instructions by one or more of the processors 804. The memory resources 806 can also include ROM or other static storage device for storing static information and instructions for one or more of the processors 804. The memory resources 806 can also include other forms of memory devices and components, such as a magnetic disk or optical disk, for purpose of storing information and instructions for use by one or more of the processors 804.

According to some examples, the memory 806 may store a plurality of software instructions including, for example, the VR content instructions 812 and platform instructions 813. The VR content instructions 812 and platform instructions 813 may be executed by one or more of the processors 804 in order to implement functionality such as described with respect to the motion prediction system 235 and virtual reality system 237 of FIG. 2.

In certain examples, the computer system 800 can receive sensor data 862 over the communication interface 850 from various AV subsystems 860 (e.g., the AV control system 220 or an on-board computer 210 respectively). In executing the VR content instructions 812 and platform instructions 813, the processing resources 804 can monitor the sensor data 862 and generate intention outputs 818 (or permissive outputs) to the output systems 820 of the AV 200 in accordance with examples described herein.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A virtual reality system for an autonomous vehicle (AV) comprising:
   one or more processors; and
   one or more memory resources storing instructions that, when executed by the one or more processors, cause the virtual reality system to:
   interface with a vehicle control system to receive environmental data while the AV is being operated autonomously by the vehicle control system through an environment;
   analyze the environmental data to anticipate a stimulus event, wherein the stimulus event represents probabilistic environmental stimuli on a rider in the AV;
   generate virtual content using at least the environmental data and the stimulus event; and
   render the virtual content for a virtual display system that presents the virtual content to the rider in the AV.

2. The virtual reality system of claim 1, further comprising instructions for:
   identifying, from the environmental data, a point of interest in the environment around the AV, wherein the environmental data includes video of the environment from one or more cameras on the AV; and
   retrieving content associated with the point of interest, wherein
   generating the virtual content for the virtual display system uses at least the video and at least part of the retrieved content associated with the point of interest.

3. The virtual reality system of claim 2, wherein generating the virtual content includes overlaying the retrieved content onto one or more visible surfaces of the point of interest.

4. The virtual reality system of claim 2, further comprising instructions for:
  tracking a head position and view direction of the rider in the AV; and
  generating the virtual content based on at least the head position and view direction.

5. The virtual reality system of claim 2, further comprising instructions for:
  in response to receiving an overlay selection from the rider in the AV, generating the virtual content based on the overlay selection.

6. The virtual reality system of claim 2, wherein the environmental data further includes 3D volumetric data of the environment, and the virtual reality system uses the 3D volumetric data for rendering the virtual depiction of the environment.

7. The virtual reality system of claim 1, wherein the virtual content includes (i) a realistic depiction of the environment and (ii) computer generated elements that are not depicted in the environment.

8. The virtual reality system of claim 1, wherein at least some of the environmental data is generated by acceleration sensors and at least some of the environmental data is route data for a road segment.

9. The virtual reality system of claim 8, further comprising instructions for:
  receiving a starting point and a destination for the AV, wherein the road segment is a route between the starting point and the destination; and
  analyzing the route data for the road segment to determine the probabilistic environmental stimuli.

10. The virtual reality system of claim 1, wherein the probabilistic environmental stimuli include one or more acceleration forces that the rider is expected to experience, including a time, direction, and magnitude of each acceleration force.

11. The virtual reality system of claim 1, further comprising instructions for:
  determining that the stimulus event exceeds a programmed threshold, wherein generating the virtual content for the virtual display system is based on a plurality of stimulus events that exceed the programmed threshold.

12. The virtual reality system of claim 1, wherein the stimulus event is incorporated into a virtual reality game and the virtual content is created as part of the virtual reality game.

13. The virtual reality system of claim 1, wherein the environmental data is generated by one or more cameras, LIDAR, radar, or sonar sensors.

14. The virtual reality system of claim 1, wherein the environmental data is received, processed, or generated by the vehicle control system.

15. The virtual reality system of claim 1, wherein the virtual display system is a head-mounted display unit worn by the rider in the AV.

16. An autonomous vehicle (AV) comprising:
  a sensor system to generate environmental data corresponding to an environment around the AV;
  a vehicle control system to utilize the environmental data to autonomously operate the AV through the environment; and
  a virtual reality system comprising:
    one or more processors; and
    one or more memory resources storing instructions that, when executed by the one or more processors, cause the virtual reality system to:
      interface with the vehicle control system to receive environmental data while the AV is being operated autonomously by the vehicle control system through the environment;
      analyze the environmental data to anticipate a stimulus event, wherein the stimulus event represents probabilistic environmental stimuli on a rider in the AV;
      generate virtual content using at least the environmental data and the stimulus event; and
      render the virtual content for a virtual display system that presents the virtual content to the rider in the AV.

17. The autonomous vehicle of claim 16, further comprising instructions for the virtual reality system for:
  identifying, from the environmental data, a point of interest in the environment around the AV, wherein the environmental data includes video of the environment from one or more cameras on the AV; and
  retrieving content associated with the point of interest, wherein
  generating the virtual content for the virtual display system uses at least the video and at least part of the retrieved content associated with the point of interest.

18. The autonomous vehicle of claim 17, wherein the probabilistic environmental stimuli include one or more acceleration forces that the rider is expected to experience, including a time, direction, and magnitude of each acceleration force.

19. The autonomous vehicle of claim 16, wherein at least some of the environmental data is generated by acceleration sensors and at least some of the environmental data is route data for a road segment.

20. A non-transitory computer-readable medium storing virtual reality instructions for an autonomous vehicle (AV), wherein the instructions when executed by one or more processors, cause the one or more processors to:
  interface with a vehicle control system to receive environmental data while the AV is being operated autonomously by the vehicle control system through an environment;
  analyze the environmental data to anticipate a stimulus event, wherein the stimulus event represents probabilistic environmental stimuli on a rider in the AV;
  generate virtual content using at least the environmental data and the stimulus event; and
  render the virtual content for a virtual display system that presents the virtual content to the rider in the AV.

* * * * *